(12) United States Patent
Hori et al.

(10) Patent No.: US 7,174,996 B2
(45) Date of Patent: Feb. 13, 2007

(54) HYDRAULIC FLUID FEEDER

(75) Inventors: Yoshiaki Hori, Saitama (JP); Tohru Nishi, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/265,610

(22) Filed: Oct. 8, 2002

(65) Prior Publication Data

US 2003/0131684 A1 Jul. 17, 2003

(30) Foreign Application Priority Data

Oct. 12, 2001 (JP) .............................. 2001-314825

(51) Int. Cl.
*F16H 57/04* (2006.01)
(52) U.S. Cl. ............... 184/6.12; 192/87.13; 192/87.18; 180/53.4; 180/292
(58) Field of Classification Search ................. 189/7.1, 189/6.12, 6.17; 192/87.1–87.19, 113.5; 180/53.4, 180/292, 293, 344, 346, 374, 375, 378
See application file for complete search history.

(56) References Cited

U.S. PATENT DOCUMENTS

| 3,747,730 A * | 7/1973 | Hause ...................... 192/87.11 |
| 4,126,201 A * | 11/1978 | Stevens ....................... 180/344 |
| 4,785,682 A * | 11/1988 | Nishimura et al. ............ 74/359 |
| 4,930,601 A * | 6/1990 | Leidecker et al. .......... 184/6.12 |
| 4,981,193 A * | 1/1991 | Lings .......................... 180/248 |
| 5,065,578 A * | 11/1991 | Nakajima et al. ............. 60/464 |
| 5,456,129 A * | 10/1995 | Tane et al. ..................... 74/467 |
| 5,836,076 A * | 11/1998 | Duta et al. ................. 29/893.1 |
| 6,044,931 A * | 4/2000 | Reed et al. ................ 184/6.12 |
| 6,325,190 B1* | 12/2001 | Yoshimoto et al. ........ 192/3.21 |
| 6,381,957 B1* | 5/2002 | Hori et al. .................... 60/436 |
| 6,484,607 B2* | 11/2002 | Shichinohe et al. ....... 74/730.1 |
| 6,712,172 B2* | 3/2004 | Inagaki et al. .............. 180/292 |
| 2001/0011616 A1* | 8/2001 | Kageyama et al. ........ 184/6.12 |

FOREIGN PATENT DOCUMENTS

JP          54103958 A   *   8/1979

* cited by examiner

*Primary Examiner*—Chong H. Kim
(74) *Attorney, Agent, or Firm*—Birch, Stewart, Kolasch & Birch, LLP

(57) ABSTRACT

Supplying fluids different in pressure from one end of a revolving shaft without providing a diagonal hole in the revolving shaft for supply holes for feeding hydraulic fluid and lubricating oil. The time for manufacturing and the cost of providing a hydraulic fluid feeder to the revolving shaft is reduced. A hydraulic fluid feeder includes a central hole provided on the centerline of the revolving shaft. Hollow tubes having a smaller outside diameter than the inside diameter of the central hole are concentrically inserted into the central hole and the central hole is partitioned. Either of the passages formed by partitioning functions as a hydraulic fluid supply passage for the hydraulic equipment and the other functions as a hydraulic fluid supply passage for another piece of hydraulic equipment or a lubricating oil supply passage for a bearing provided on the revolving shaft.

10 Claims, 14 Drawing Sheets

HYDRAULIC FLUID FEEDER

CROSS-REFERENCE TO RELATED APPLICATIONS

The present application claims priority under 35 USC 119 to Japanese Patent Application No. 2001-314825 filed on Oct. 12, 2001 the entire contents thereof is hereby incorporated by reference.

BACKGROUND OF THE INVENTION

1. Field of the Invention

The present invention relates to a hydraulic fluid feeder for the revolving shaft of a transmission of an internal combustion engine provided with an automatic transmission for a vehicle which is provided with hydraulic equipment such as a hydraulic clutch operated by switching oil pressure.

2. Description of Background Art

Heretofore, hydraulic fluid has been supplied to a hydraulic clutch via a central hole of a revolving shaft from one end of the revolving shaft and lubricating oil has been supplied to a lubricating location via a central hole of the revolving shaft from the other end of the revolving shaft. As hydraulic fluid and lubricating oil are different in pressure, an oil hole tilted on the basis of the central line of the shaft is required to be provided from the outside face of the revolving shaft towards the central hole to feed oil to which a predetermined pressure is applied to a predetermined location, and a complex structure is required. It requires a great deal of time to work a diagonal hole of a shaft and in addition, the cost is also high.

Hydraulic fluid is sometimes supplied to a hydraulic clutch via an oil supply pipe laid from the side of a crankcase cover to the inside of a central hole of a revolving shaft and the oil supply pipe is fixed to the crankcase cover. When oil is supplied to a hydraulic clutch in the center of the revolving shaft of a transmission, an oil supply pipe is required to be long. In such structure, it is difficult to attach or detach the crankcase cover, particularly in case where the crankcase cover is to be detached in an onboard state. The crankcase cover cannot be detached until the oil supply pipe is removed. Thus, the serviceability of the unit is deteriorated. In a state in which the oil supply pipe is fixed to the crankcase cover, a large depository is required.

SUMMARY AND OBJECTS OF THE INVENTION

For a supply hole for feeding hydraulic fluid and lubricating oil, no diagonal hole is required to be worked in the revolving shaft. Thus, the working time and cost are reduced. The attachment/detachment of the crankcase cover is facilitated and the serviceability is enhanced. Further, the large depository of the crankcase cover is not required.

The present invention is made to solve the problems wherein a hydraulic fluid feeder for a revolving shaft is provided with at least one piece of hydraulic equipment operated by switching oil pressure on the revolving shaft. A central hole is provided on the centerline of the revolving shaft with a hollow tube having a smaller outside diameter than the inside diameter of the central hole being concentrically inserted into the central hole and the central hole is partitioned. Either one of the passages formed by partitioning functions as a hydraulic fluid supply passage for the hydraulic equipment and the other passage functions as a hydraulic fluid supply passage for another piece of hydraulic equipment or a lubricating oil supply passage for a bearing provided on the revolving shaft.

As the invention is configured as described above, concentric outer and inner fluid passages are formed inside the central hole of the revolving shaft. Since oil that is different in pressure can be supplied from one end of the revolving shaft, the working of a diagonal hole is not required. Thus, working time and cost can be reduced.

The present invention includes a plurality of hollow tubes that are concentrically inserted into the central hole with the central hole being partitioned into three or more passages to provide a hydraulic fluid supply passage or a lubricating oil supply passage. Thus, even if a plurality of pieces of hydraulic equipment are provided on the revolving shaft, oil that is different in pressure can be supplied from one end of the revolving shaft, reducing working time and cost.

The present invention provides an end on the upstream side of a passage of the hollow tube that is connected to a hydraulic fluid supply passage provided on a casing via a fluid reservoir provided to the casing. Thus, even if the hydraulic fluid supply passage on the side of the casing and a revolving shaft are spaced apart, hydraulic fluid can be supplied from the side of the casing. The casing denotes a front crankcase cover in an embodiment described later.

The present invention includes a fluid reservoir provided on a casing that is partitioned into a plurality of small fluid reservoirs by a partitioning member, a plurality of hydraulic fluid supply passages are bored in the casing and are connected to different small fluid reservoirs with the ends on the upstream side of a plurality of fluid passages formed in concentric hollow tubes that are also connected to different small fluid reservoirs. Thus, in the case where the hydraulic fluid supply passage on the side of the casing and a revolving shaft are spaced apart and a plurality of hydraulic equipment are provided on the revolving shaft, hydraulic fluid can be also supplied from the side of the casing.

The present invention includes a hollow tube connected to a fluid reservoir of the casing that can be attached/detached from the outside of the casing. Thus, as the hollow tube can be attached after the casing is attached or the casing can be detached after the hollow tube is detached, the attachment/detachment of the casing is facilitated and serviceability is enhanced. As the casing can be detached, a large location for storing the casing is not required.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
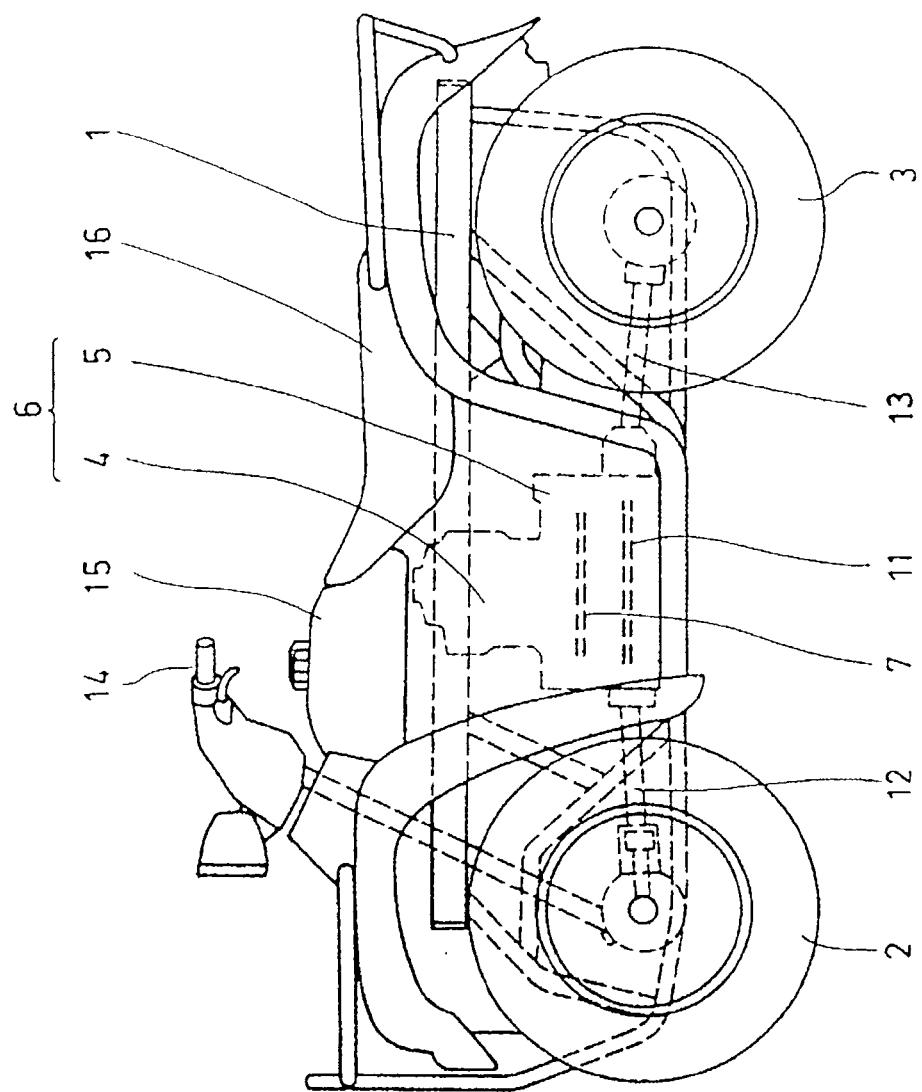
FIG. 1 is a side view showing a four-wheel buggy (a saddle-type vehicle for operating on wasteland) in which an internal combustion engine according to the invention is mounted.
Figure 4:
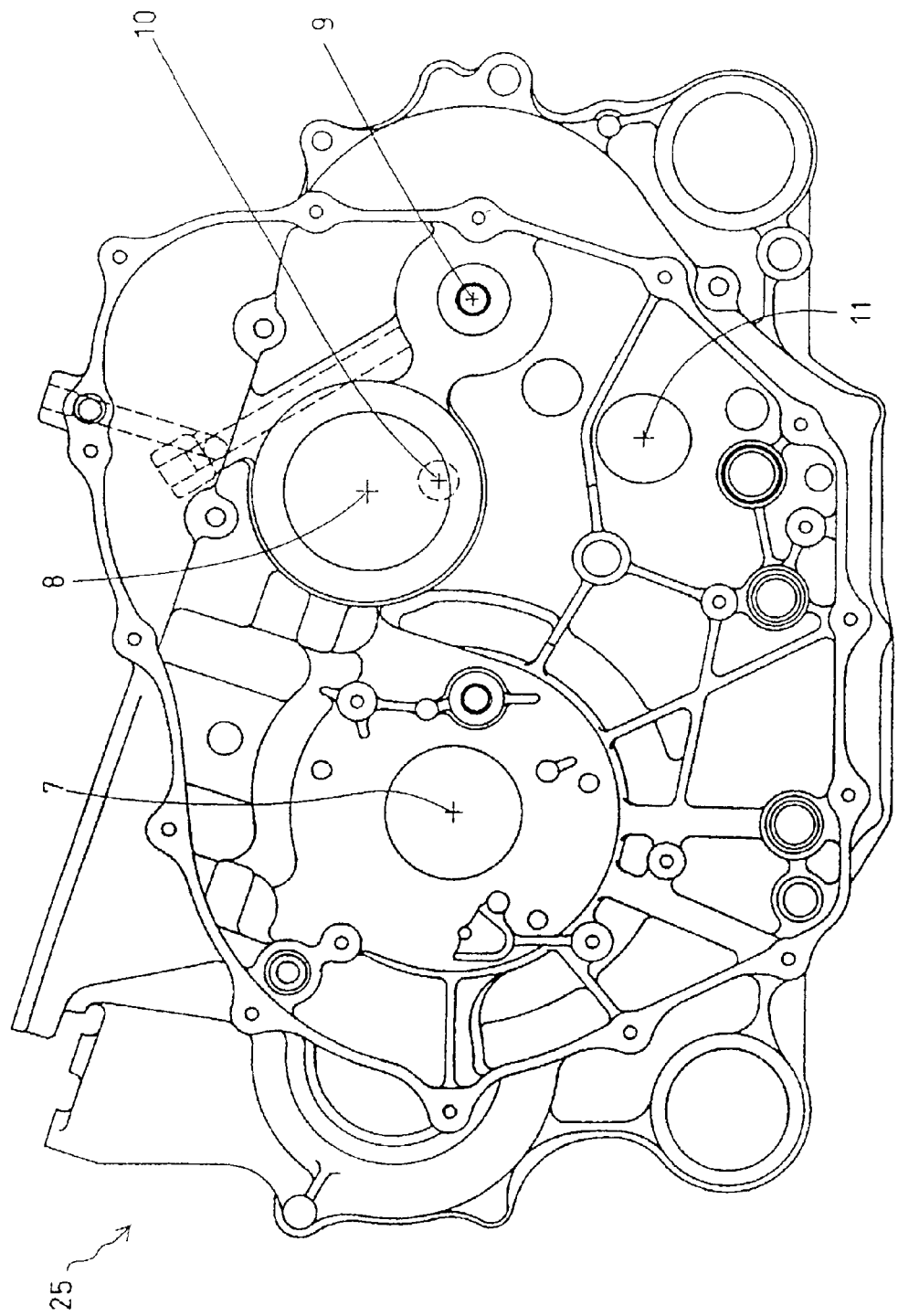
FIG. 4 shows a front crankcase viewed from the front.

FIG. 1 is a side view showing a four-wheel buggy (a saddle-type vehicle for operating on wasteland) wherein an internal combustion engine is provided with a hydraulic automatic transmission. The buggy is provided with a pair of right and left front wheels 2 and a pair of right and left rear wheels 3 in the front and in the rear of a body frame 1. A power unit 6 in which an internal combustion engine 4 and a transmission 5 are integrated are supported in the center of the body frame 1. The power unit 6 is arranged with a crankshaft 7 directed in a longitudinal direction of the body. The rotation of the crankshaft 7 is transmitted to an output shaft 11 via the main shaft 8 of the transmission, a counter shaft 9 and an intermediate shaft 10, respectively, as shown in FIG. 4. These shafts are parallel to the crankshaft and are arranged in the longitudinal direction of the body. The front wheel 2 is driven by a front wheel driving shaft 12 connected to the front end of the output shaft 11 and the rear wheel 3 is driven by a rear wheel driving shaft 13 connected to the rear end of the output shaft 11. On the upside of the body, a steering handlebar 14, a fuel tank 15 and a saddle-type seat 16 are equipped in this order from the front.

Figure 2:
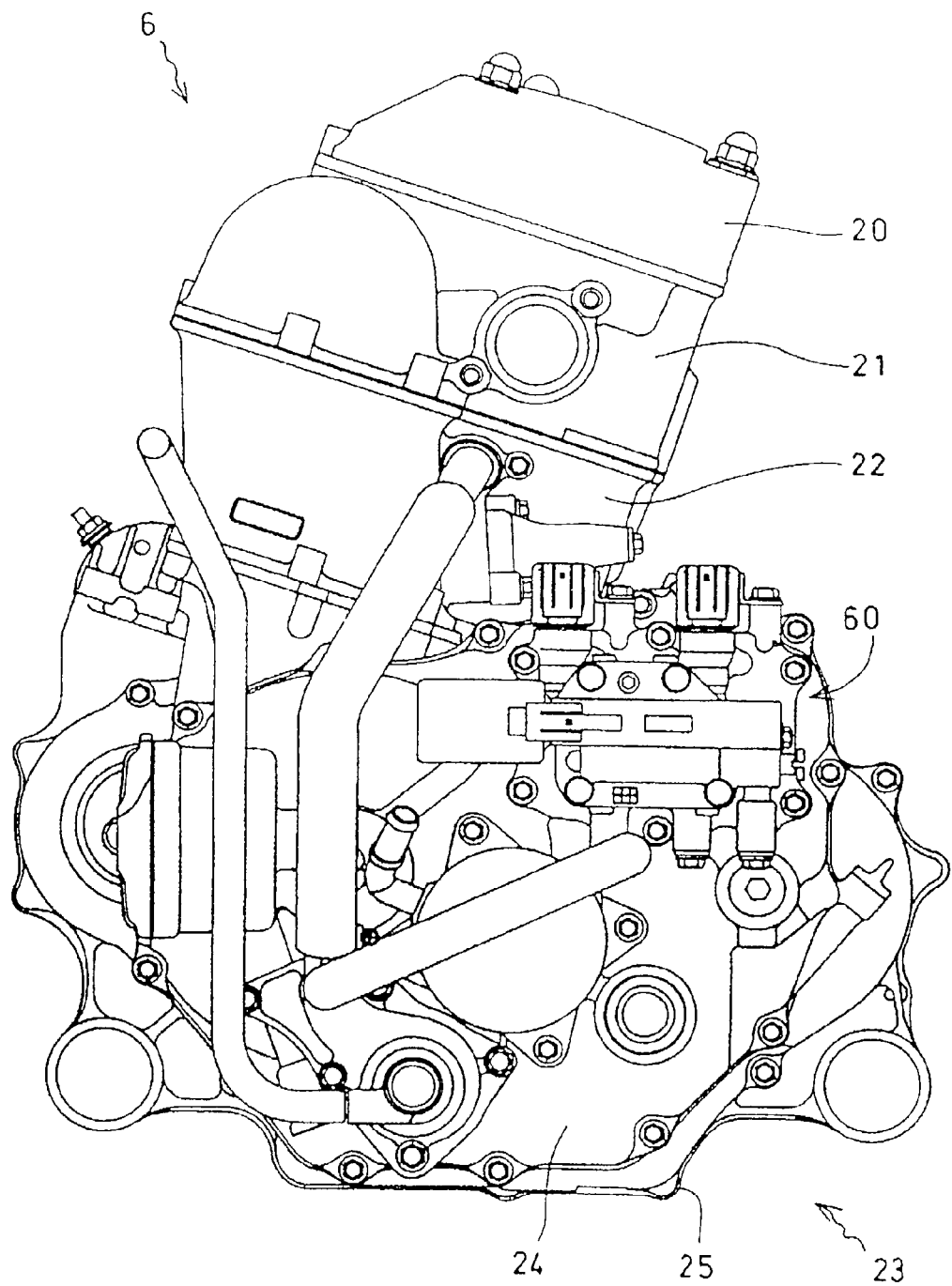
FIG. 2 is a front view showing a power unit according to the invention.
Figure 3:
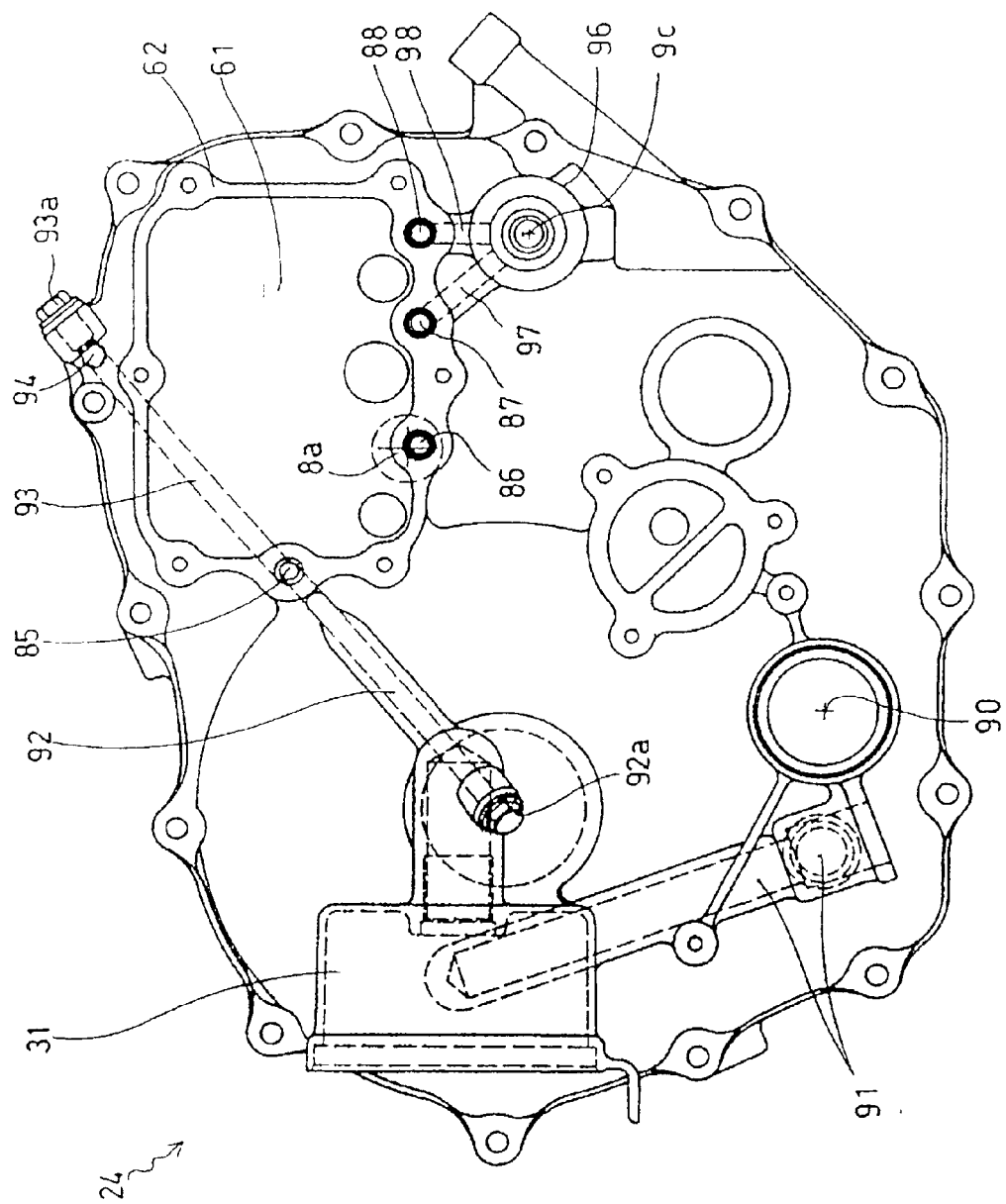
FIG. 3 shows a front crankcase cover viewed from the front.

FIG. 2 is a front view showing the front of the power unit 6. The body of the power unit 6 is roughly composed of four parts of a cylinder head cover 20, a cylinder head 21, a cylinder block 22 and a crankcase 23 in that order from the head. The crankcase 23 is divided into four parts on a face perpendicular to the crankshaft 7 and includes a front crankcase cover 24, a front crankcase 25, a rear crankcase 26 and a rear crankcase cover 27 in that order from the front (these are partially shown in FIGS. 5 and 6). In FIG. 2, the front crankcase cover 24 is illustrated and the front crankcase 25 is slightly shown in the periphery. Various equipment and piping are mounted on the front of the front crankcase cover 24. A valve body 60 of a hydraulic control unit is provided with an orifice of a fluid passage and an orifice clogging preventing mechanism according to the present invention. FIG. 3 illustrates the front crankcase cover 24 viewed from the front in a state in which the various equipment is not mounted and FIG. 4 shows the front crankcase 25 viewed from the front.

Figure 5:
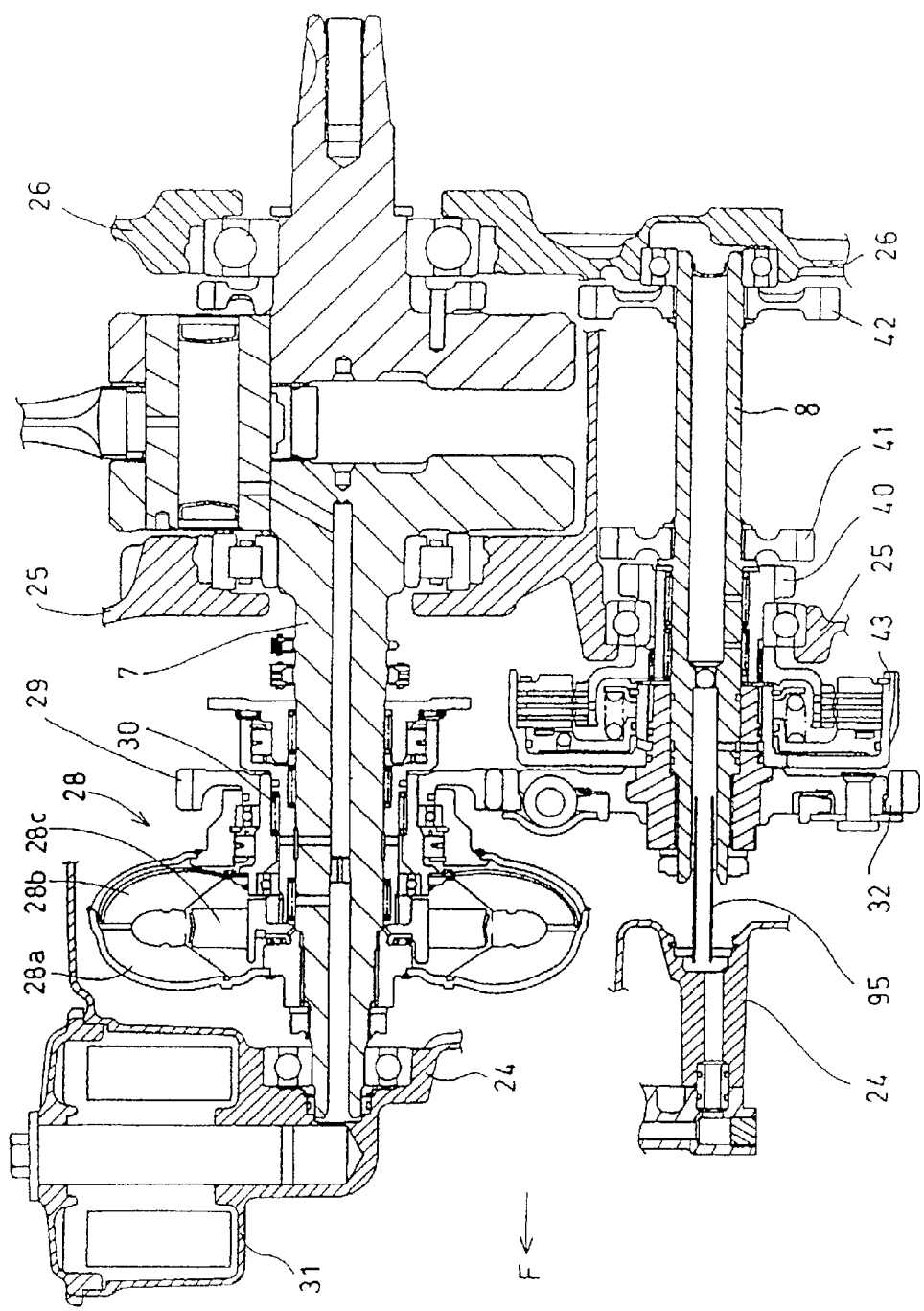
FIG. 5 is a longitudinal section of the inside of a crankcase showing the relationship between a crankshaft and a main shaft.
Figure 6:
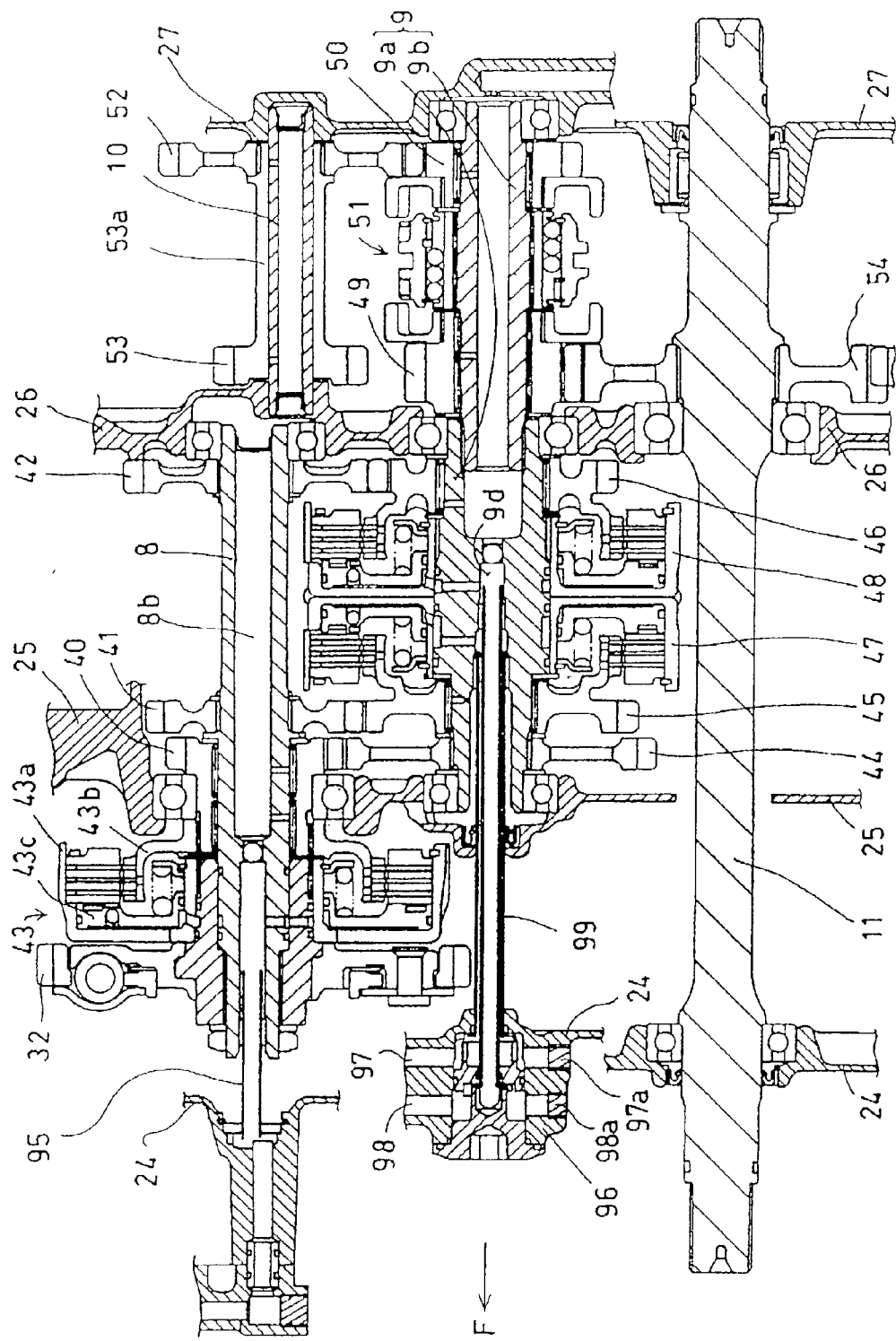
FIG. 6 is a longitudinal section of the inside of the crankcase showing the relationship between the main shaft, a counter shaft, an intermediate shaft and an output shaft.
Figure 7:
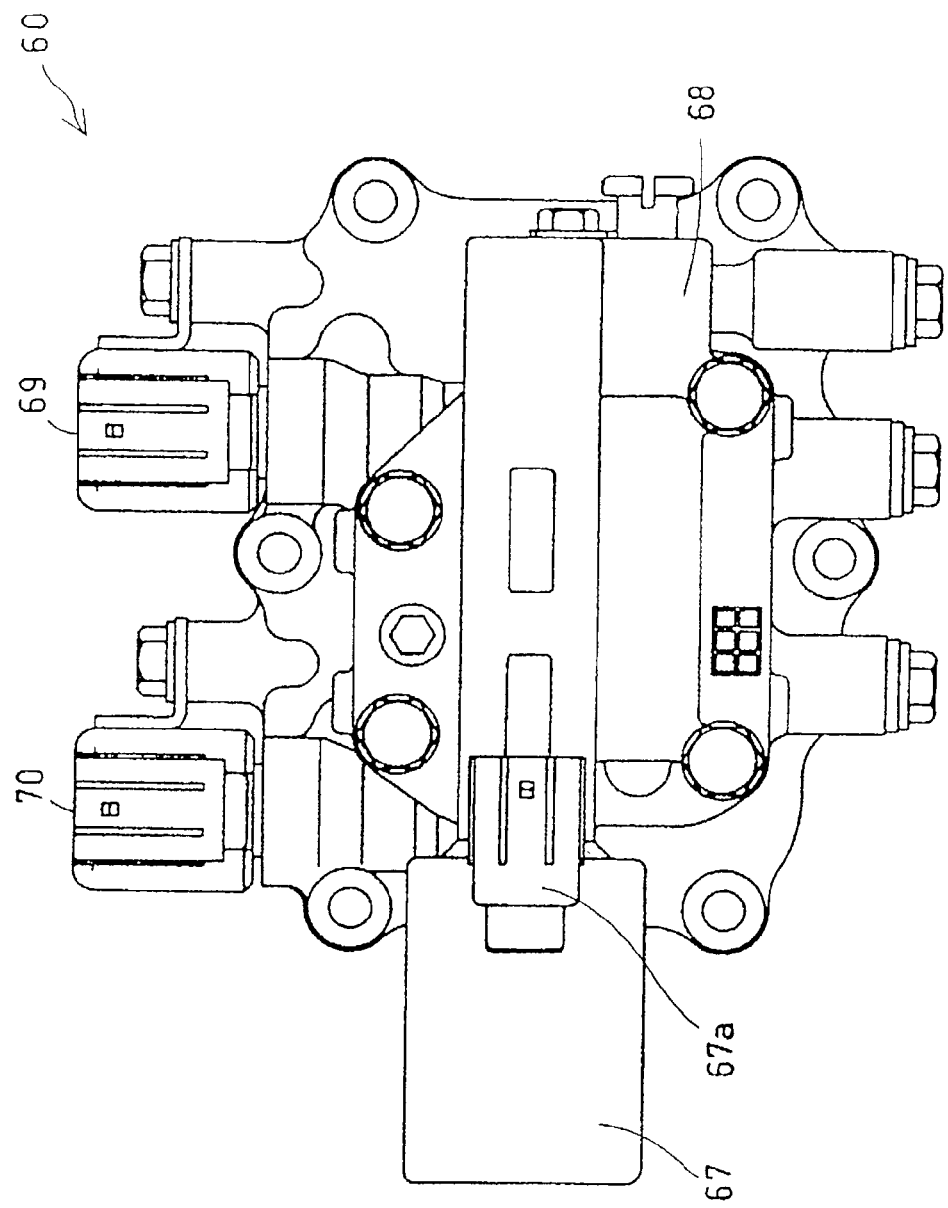
FIG. 7 is a front view showing a valve body.

In FIG. 4, each position of the crankshaft 7, the main shaft 8 of the transmission, the counter shaft 9, the intermediate shaft 10 and the output shaft 11 are shown. FIGS. 5 and 6 are longitudinal sections showing the inside of the crankcase including primary shafts in the crankcase, FIG. 5 shows the relationship between the crankshaft 7 and the main shaft 8 and FIG. 6 shows the relationship between the main shaft 8, the counter shaft 9, the intermediate shaft 10 and the output shaft 11. In FIG. 5, an arrow F indicates the front.

FIG. 5 shows a power transmission mechanism between the crankshaft 7 and the main shaft 8. The crankshaft 7 is supported by the front and rear crankcases 25 and 26 via a bearing. A front extended part of the crankshaft 7 is supported by the front crankcase cover 24 via a bearing. A driving gear 29 is provided on the crankshaft 7 via a torque converter 28. The driving gear 29 is held by the crankshaft 7 via a needle bearing 30 so that the driving gear can revolve. The torque converter 28 is provided with a pump impeller 28a fixed to the crankshaft 7, a turbine runner 28b opposite to the pump impeller and a stator 28c. The driving gear 29 is revolvable around the crankshaft 7 and is connected to the turbine runner 28b. When the torque converter 28 is connected, power from the crankshaft 7 can be transmitted. An oil filter 31 is provided on the front crankcase cover 24 that supports the front end of the crankshaft 7. A driven gear 32 is always engaged with the driving gear 29 and is fixed to the front end of the main shaft 8 of the transmission. When the torque converter 28 is connected, the revolution of the crankshaft 7 is transmitted to the main shaft 8 via the driving gear 29 and the driven gear 32.

FIG. 6 shows the power transmission mechanism between the main shaft 8 of the transmission, the counter shaft 9, the intermediate shaft 10 and the output shaft 11. The main shaft 8 of the transmission is supported by the front and rear crankcases 25 and 26 via a bearing. A first-speed driving gear 40, a second-speed driving gear 41 and a third-speed driving gear 42, respectively, are provided on the main shaft 8 that are different in the number of gear teeth according to a gear ratio. The second-speed driving gear 41 and the third-speed driving gear 42 are fixed gears fixed to the main shaft 8. However, the first-speed driving gear 40 is supported by the main shaft 8 via a needle bearing so that the first-speed driving gear can be rotated. In the following description, an idle gear is described which is a gear held by a needle bearing so that the gear can be rotated around a rotation axis. A hydraulic multiple disc clutch for first speed 43 is provided between the main shaft 8 and the first-speed driving gear 40. For this clutch, a clutch outer 43a is fixed to the main shaft and a clutch inner 43b is connected to the first-speed driving gear 40 which is the idle gear. When hydraulic fluid is supplied between the clutch outer 43a and a pressure plate 43c respectively of this clutch and is pressurized, the pressure plate 43c is moved and connects the clutch, the first-speed driving gear 40 is fixed to the main shaft 8.

The counter shaft 9 is an integrated counter shaft acquired by connecting a front 9a and a rear 9b. The counter shaft 9 is supported by the front crankcase 25, the rear crankcase 26 and the rear crankcase cover 27 via a bearing. A first-speed driven gear 44, a second-speed driven gear 45 and a third-speed driven gear 46, respectively, are always engaged with the first-speed driving gear 40, the second-speed driving gear 41 and the third-speed driving gear 42, respectively, of the main shaft 8 are provided on the front 9a of the counter shaft 9. The first-speed driven gear 44 is a fixed gear fixed to the counter shaft. However, the second-speed driven gear 45 and the third-speed driven gear 46 are idle gears. A hydraulic multiple disc clutch for a second speed 47 and a hydraulic multiple disc clutch for a third speed 48 are provided between the counter shaft 9 and either of these idle gears. The respective clutch outers of these clutches are fixed to the counter shaft 9 and the respective clutch inners are connected to the idle gears. When hydraulic fluid is supplied between the clutch outer and a pressure plate, respectively, of this clutch and is pressurized, the pressure plate is moved and connects the clutch. The idle gears are fixed to the counter shaft 9 and power transmission at second or third speed is enabled.

A driving gear for normal rotation 49 and a driving gear for reverse rotation 50 are provided to the rear 9b of the counter shaft 9. These are both idle gears. The gear with a manual dog clutch 51 provided in a medium is engaged and is fixed to the rear counter shaft.

An intermediate shaft 10 is supported by the rear crankcase 26 and the rear crankcase cover 27. A first intermediate gear 52 is always engaged with the driving gear for reverse rotation 50 and a second intermediate gear 53 is connected to the first intermediate gear 52 via a long sleeve 53a are held by the intermediate shaft 10 so that they can be turned.

The output shaft 11 is supported via a bearing by the front crankcase cover 24, the rear crankcase 26 and the rear crankcase cover 27. The output shaft 11 pierces the front crankcase 25 without being touched to the front crankcase 25. A driven gear 54 is always engaged with the driving gear for normal rotation 49 and the second intermediate gear 53 is fixed to the output shaft 11. The driven gear 54 is normally rotated or reversibly rotated via the gear with which the dog clutch 51 is engaged and rotates the output shaft 11 in a direction suitable for the forward or backward travel of the vehicle. Reverse rotation is controlled so that it occurs only when the counter shaft is rotated at the first speed.

The gears in the transmission are all constant-mesh gears. Depending upon which clutch of the hydraulic multiple disc clutches 43, 47, 48 is to be connected it is determined that any transmission gear ratio is executed. It is a valve body 60 built by a cut-off poppet valve and a solenoid for driving it as an integrated hydraulic control unit that controls oil pressure. The valve body is attached to the front of the front crankcase cover 24 as shown in FIG. 2. The valve body 60 is mounted on a mounting concave portion 61 of the front crankcase cover 24 as shown in FIG. 3 and is fixed on a mounting face 62 on the periphery of the mounting concave portion via a gasket. In a state in which the valve body is mounted, a front half of the valve body 60 is exposed to the outside of the front crankcase cover 24 and a rear half is buried in the mounting concave portion 61 of the front crankcase cover 24. The mounting face 62 is formed in parallel with a divided face of the crankcase.

Figure 8:
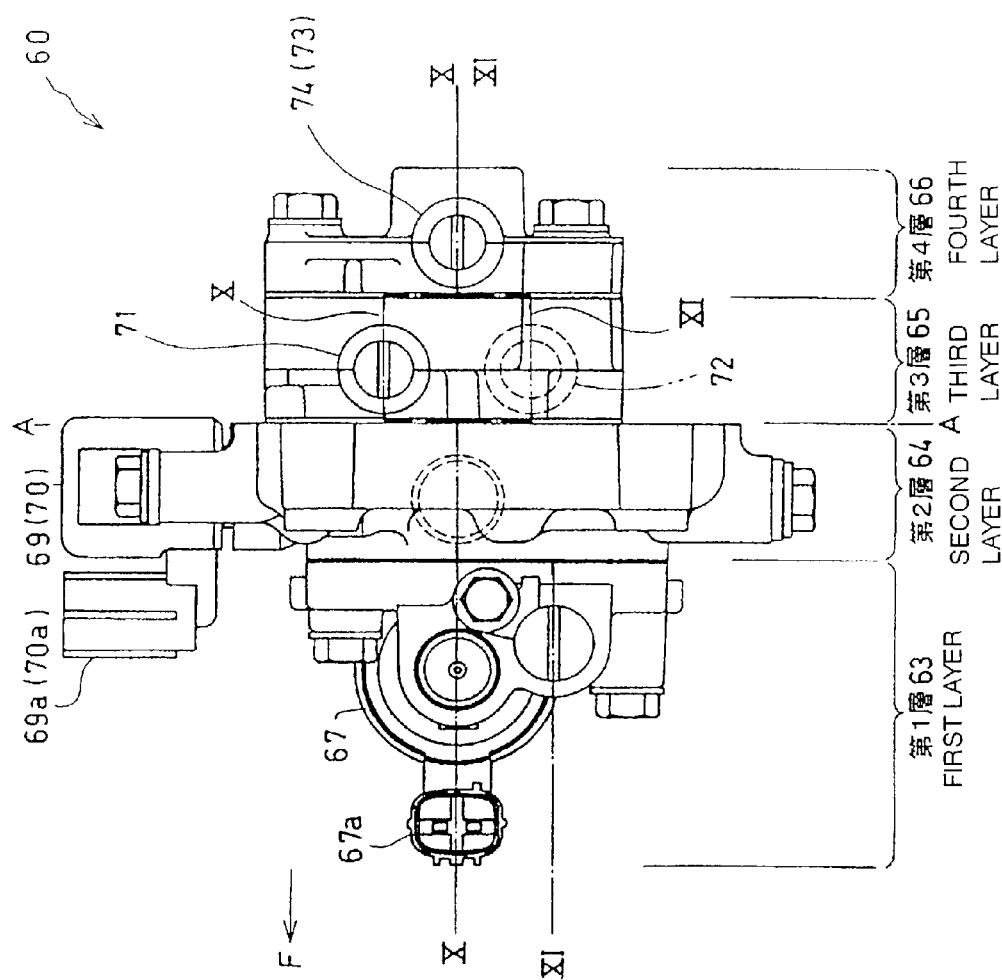
FIG. 8 is a side view showing the valve body viewed from the right side.
Figure 10:
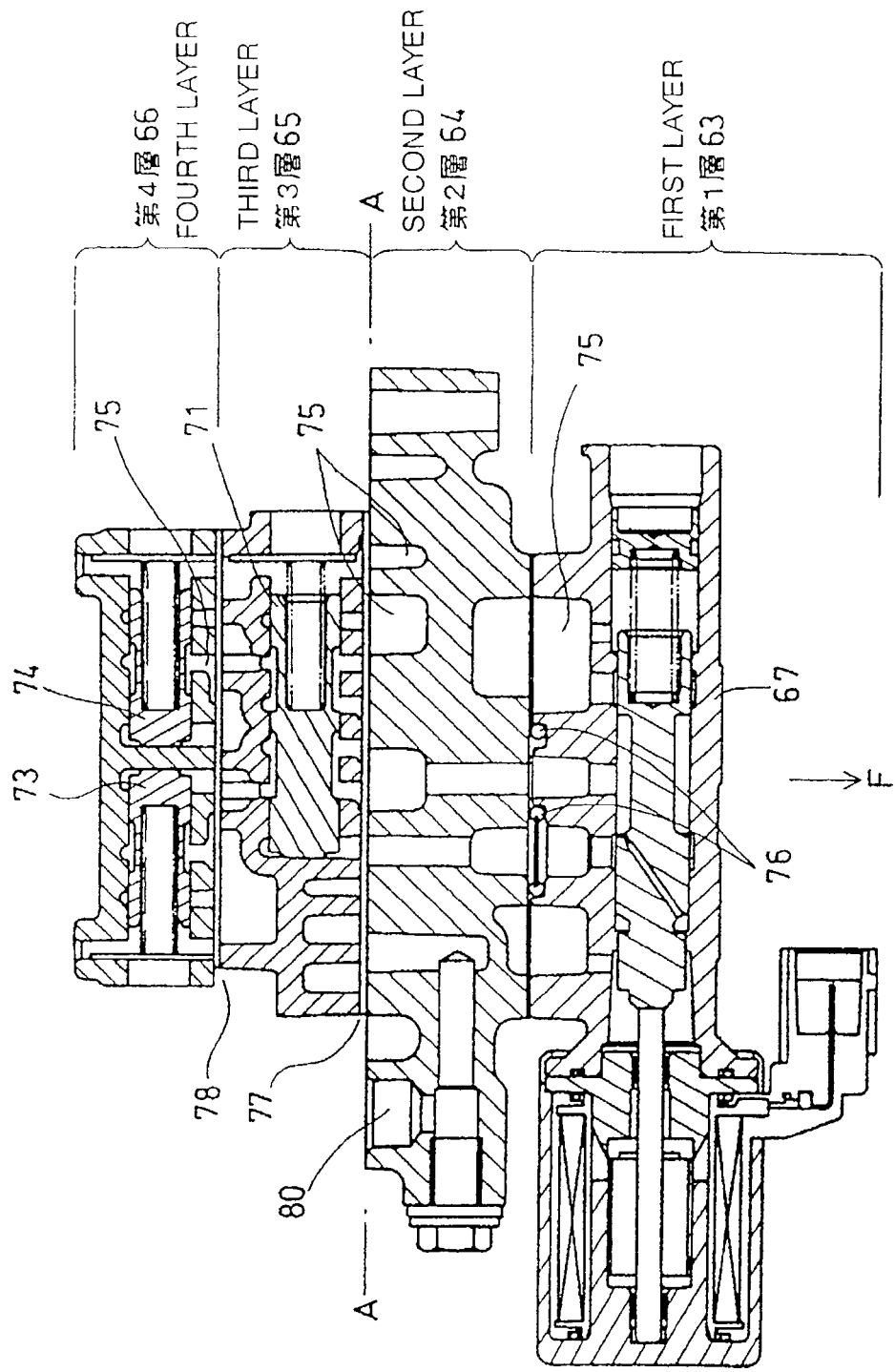
FIG. 10 is a sectional view viewed along a line X—X in FIG. 8.
Figure 11:
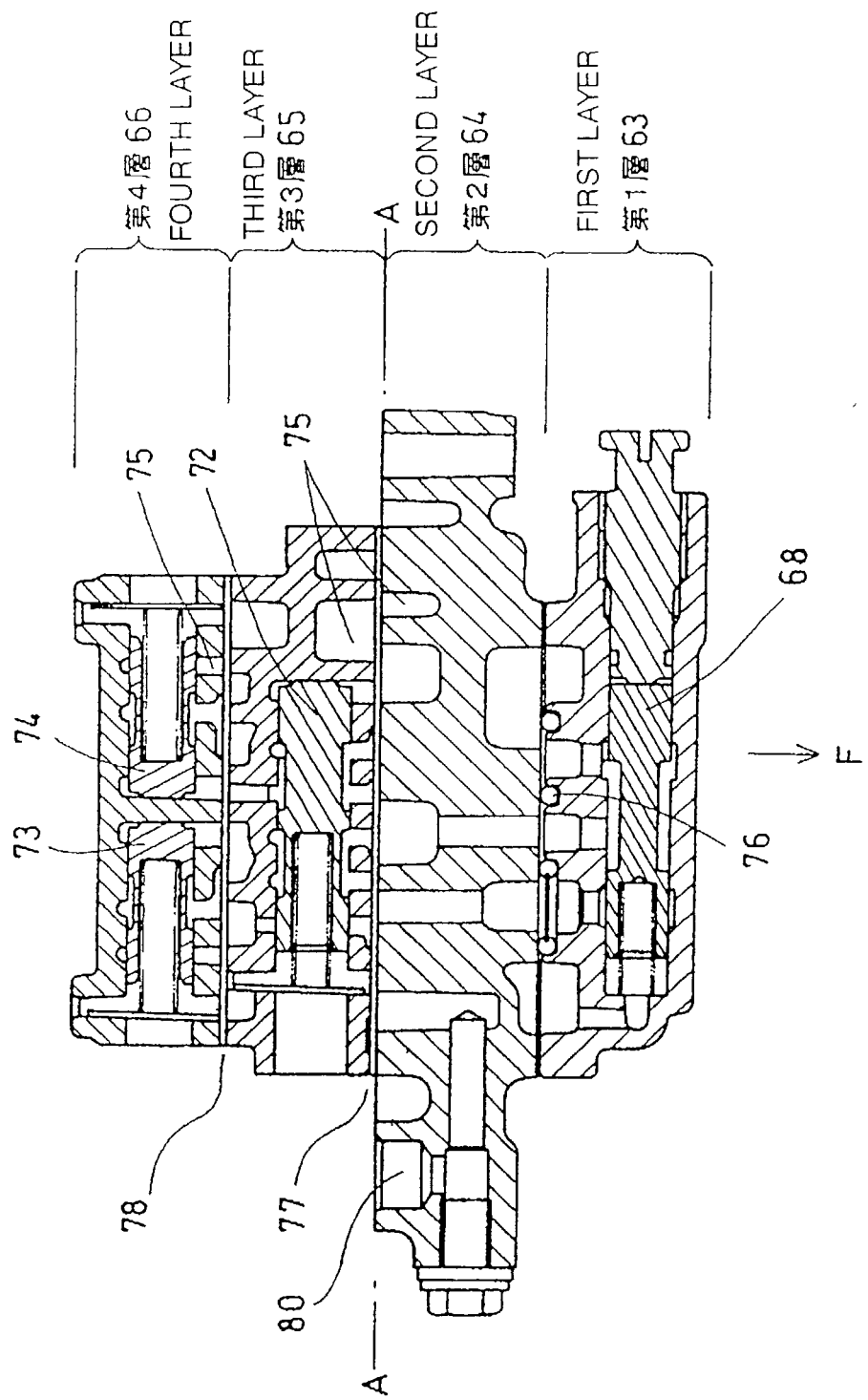
FIG. 11 is a sectional view viewed along a line XI—XI in FIG. 8.

As shown in FIGS. 8, 10 and 11, an arrow F indicates the front. This unit is composed of four layers as a whole, is detailedly composed of a first layer 63, a second layer 64, a third layer 65 and a fourth layer 66 in this order from the front. The rear face of the second layer, that is, a face shown by a line A—A in FIGS. 8, 10 and 11 is in contact with the mounting face 62 of the front crankcase cover and is fixed by a bolt via the gasket. The third layer 65 and the fourth layer 66 of the valve body 60 are housed in the mounting concave portion 61 of the front crankcase cover.

A linear solenoid valve 67 and an emergency valve 68 are provided on the first layer 63 of the valve body 60. An electric wire connecting terminal 67 is provided on the solenoid. A solenoid valve for switching first speed and second speed 69 and a solenoid valve for switching second speed and third speed 70 are provided on the second layer 64. Electric wire connecting terminals 69a and 70a are provided on each solenoid. A spool valve for switching first speed and second speed 71 and a spool valve for switching second speed and third speed 72, the respective spools of which are driven by oil pressure according to the on-off action of each solenoid valve, are provided on the third layer 65. The spool valves are valves for controlling the supply of hydraulic fluid to the hydraulic multiple disc clutches 43, 47 and 48. Hydraulic control valves 73 and 74 are provided on the fourth layer 66. The control valves are valves for controlling the discharge of hydraulic fluid from the hydraulic multiple disc clutches 43, 47 and 48.

Figure 12:
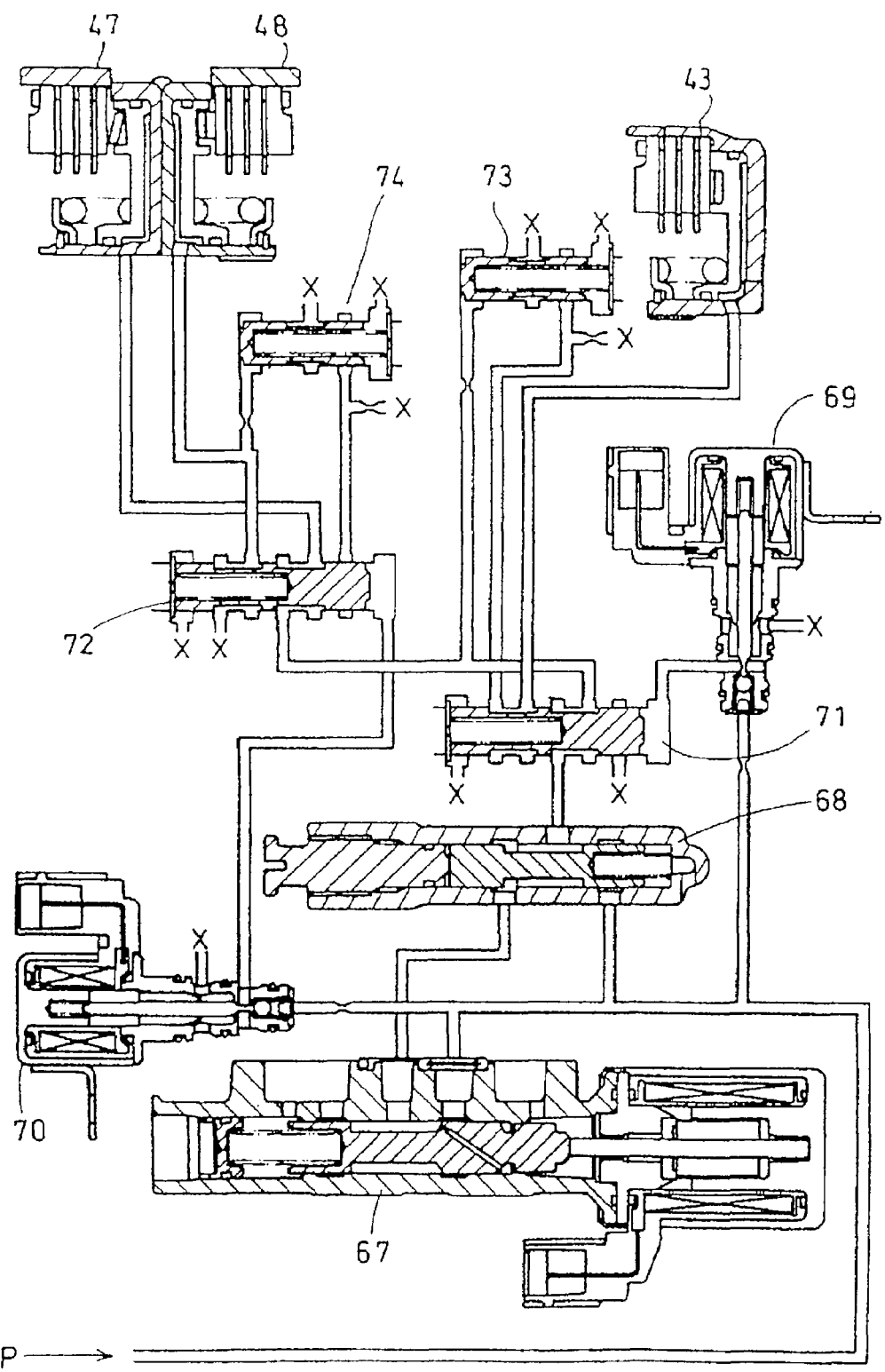
FIG. 12 is a schematic diagram showing a hydraulic system of control equipment of a transmission housed in the valve body.

FIG. 12 is a schematic diagram of hydraulic fluid for connecting the equipment. As shown in FIG. 12, all of the equipment is built in the valve body 60 except the hydraulic multiple disc clutches 43, 47 and 48. A part of the fluid fed under pressure through a filter from an oil pump (not shown) is provided in the crankcase 23 and is driven by the internal combustion engine 4 and is supplied to the system from a direction shown by an arrow P in a lower part of FIG. 12 as hydraulic fluid for operating the hydraulic multiple disc clutch. A discharge port shown by X in FIG. 12 is a discharge port for fluid and used hydraulic fluid discharged from the discharge port is collected in an oil tank not shown. The other part of the fluid through the filter is fed to each part as hydraulic fluid for the torque converter or lubricating oil for the transmission and a valve cam though its path is not shown in the schematic diagram.

As shown in FIG. 12, hydraulic fluid is supplied to the clutch further via each spool valve for switching through the linear solenoid valve 67. The linear solenoid valve 67 is a valve for slacking the rise of oil pressure when the supply of hydraulic fluid is initiated. The hydraulic fluid through the linear solenoid valve 67 is fed to the spool valve for switching via the emergency valve 68. The emergency valve 68 normally fulfills only a role of providing a passage of hydraulic fluid, however, when the linear solenoid valve 67 fails, the emergency valve provides a new path for making hydraulic fluid flow without passing the linear solenoid valve 67 and is manually operated when the linear solenoid valve fails.

The solenoid valve for switching first speed and second speed 69 and the solenoid valve for switching second speed and third speed 70 have the on-off control of oil pressure for driving each spool of the spool valve for switching first speed and second speed 71 and the spool valve for switching second speed and third speed 72, and the supply destination of hydraulic fluid of each spool valve 71, 72 is determined depending upon the position of the spool. When hydraulic fluid is supplied to any of the hydraulic multiple disc clutches 43, 47 and 48, the clutch is connected, the idle gear connected to the clutch is fixed to the shaft and a shift is made according to the transmission gear ratio defined for the gear. At this time, hydraulic fluid is required to be discharged from the connected hydraulic multiple disc clutch before the shift. Discharged fluid is discharged via a hydraulic control valve 73 or 74 the oil pressure is controlled and inside the hydraulic control valves 73 and 74 a suitable fluid passage is formed.

As shown in FIGS. 10 and 11, on an opposite face of each layer of the valve body 60 to the adjacent layer, multiple fluid passages 75 in the hydraulic system shown in FIG. 12 are formed. In a part wherein fluid passages on the surface and the rear surface are required to be connected in each layer, a fluid passage perpendicular to the opposite face is provided with the fluid passage piercing the inside of the layer. O-ring 76 is installed in a communicating part of the fluid passages of both layers on the opposite faces of the first and second layers so as to prevent fluid from leaking. Steel plates 77 and 78 are inserted between the opposite faces of the second layer and the third layer and the opposite faces of the third layer and the fourth layer. A fluid passage hole is provided in locations of this plate required to connect a groove type fluid passage provided on the surface of each layer.

Figure 9:
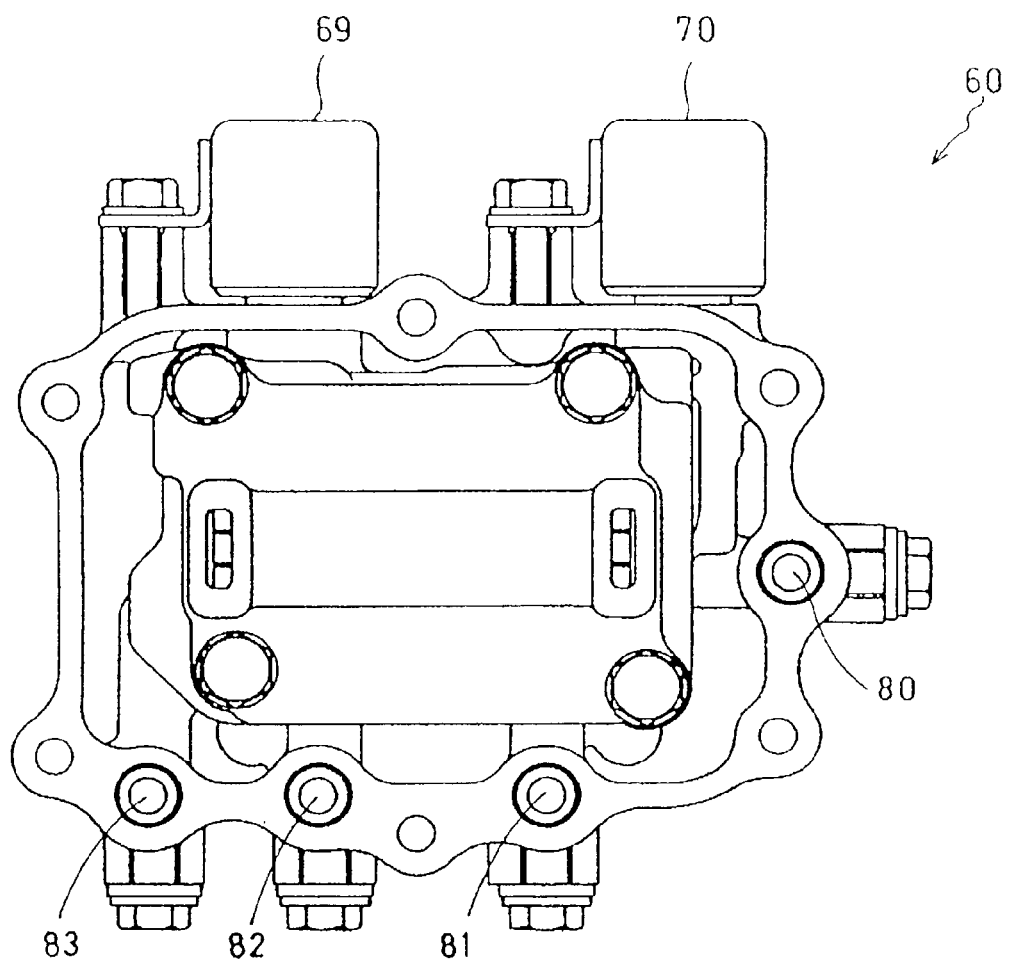
FIG. 9 is a rear view showing the valve body.

As shown in FIG. 9, an inlet 80 is provided for hydraulic fluid to the valve body 60. An outlet 81 is provided for hydraulic fluid to flow towards the hydraulic multiple disc clutch for first speed. An outlet 82 is provided for hydraulic fluid to flow towards the hydraulic multiple disc clutch for the second speed. An output 83 is provided for hydraulic fluid to flow towards the hydraulic multiple disc clutch for the third speed. The inlet 80 of hydraulic fluid is also shown in FIGS. 10 and 11.

Figure 13:
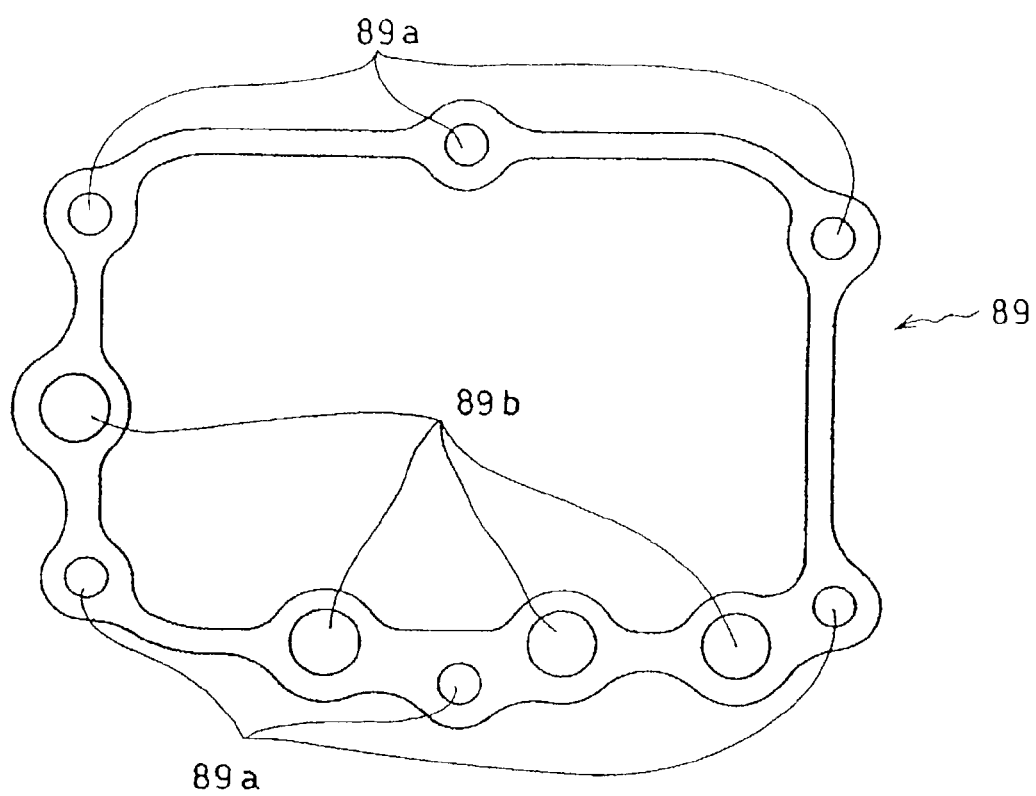
FIG. 13 is a plan showing a gasket for attaching the valve body.

Openings on the side of the front crankcase cover 24 corresponding to the inlet 80 and the outlets 81, 82 and 83 of hydraulic fluid shown in FIG. 9 are equivalent to a supply port 85 of hydraulic fluid to the valve body 60 provided to the valve body mounting face 62 shown in FIG. 3, an inlet 86 of hydraulic fluid towards the hydraulic multiple disc clutch for the first speed, an inlet 87 of hydraulic fluid towards the hydraulic multiple disc clutch for the second speed and an inlet 88 of hydraulic fluid towards the hydraulic multiple disc clutch for the third speed. When the valve body 60 is mounted on the valve body mounting face 62, a gasket 89 shown in FIG. 13 is inserted. A small-diameter hole 89a provided on the gasket is a mounting bolt inserting hole and a large-diameter hole 89b is a hydraulic fluid passage hole.

As shown in FIG. 3, an extended position 90 of the centerline of a pump shaft of an oil pump is provided. Note that the oil pump is not shown. The oil pump is provided between the front crankcase cover 24 and the front crankcase 25. Oil fed from the oil pump is fed to the oil filter 31 via an oil passage 91 from inside the wall of the front crankcase cover 24. After the oil filter filters out foreign matter from the oil, the oil is fed via an oil passage 92 and a part of the oil is fed to the valve body 60 from the hydraulic fluid supply port 85. The other part of the oil is fed to locations requiring lubrication via an oil passage 93. An oil passage 94 is perpendicular to the oil passage 93 and extends in a direction of the front crankcase 25.

The oil passages provided on the front crankcase cover 24 are all made from the outside face of the front crankcase cover 24, the linear short oil passages mutually communicate inside and form a long bent oil passage. The open ends made during manufacture are directed outside the front crankcase cover of the oil passages and are blocked by a blocking bolt. As illustrated in FIG. 3 blocking bolts 92a and 93b are provided. A similar oil passage is also formed in the front and rear crankcases and the rear crankcase cover and is utilized as a supply path for lubricating oil.

As shown in FIG. 3, an extended position 8a of the centerline of the main shaft 8 of the transmission is provided. Note that the transmission is not shown. Hydraulic fluid fed from the valve body 60 to the inlet 86 of hydraulic fluid towards the hydraulic multiple disc clutch for the first speed is fed from the rear face of the front crankcase cover 24 to the central hole 8b of the main shaft via a pipe for supplying hydraulic fluid 95 (shown in FIGS. 5 and 6) and is supplied to the hydraulic multiple disc clutch for the first speed 43.

As shown in FIG. 3, an extended position 9c of the centerline of the counter shaft 9 is provided. A fluid passage connecting part 96 is provided in this part of the front crankcase cover 24 and fluid passages 97 and 98 are formed from the inlet 87 of hydraulic fluid towards the hydraulic multiple disc clutch for the second speed and the inlet 88 of hydraulic fluid towards the hydraulic multiple disc clutch for the third speed to the fluid passage connecting part 96. Hydraulic fluid fed from the valve body 60 to the inlet 87 or the inlet 88 of hydraulic fluid is supplied to the hydraulic multiple disc clutch for second speed 47 or the hydraulic multiple disc clutch for the third speed 48 via either an inner or outer passage of a double pipe 99 (shown in FIG. 6) for supplying hydraulic fluid supplied from the fluid passage connecting part 96 to the central hole 9d of the counter shaft 9.

Figure 14:
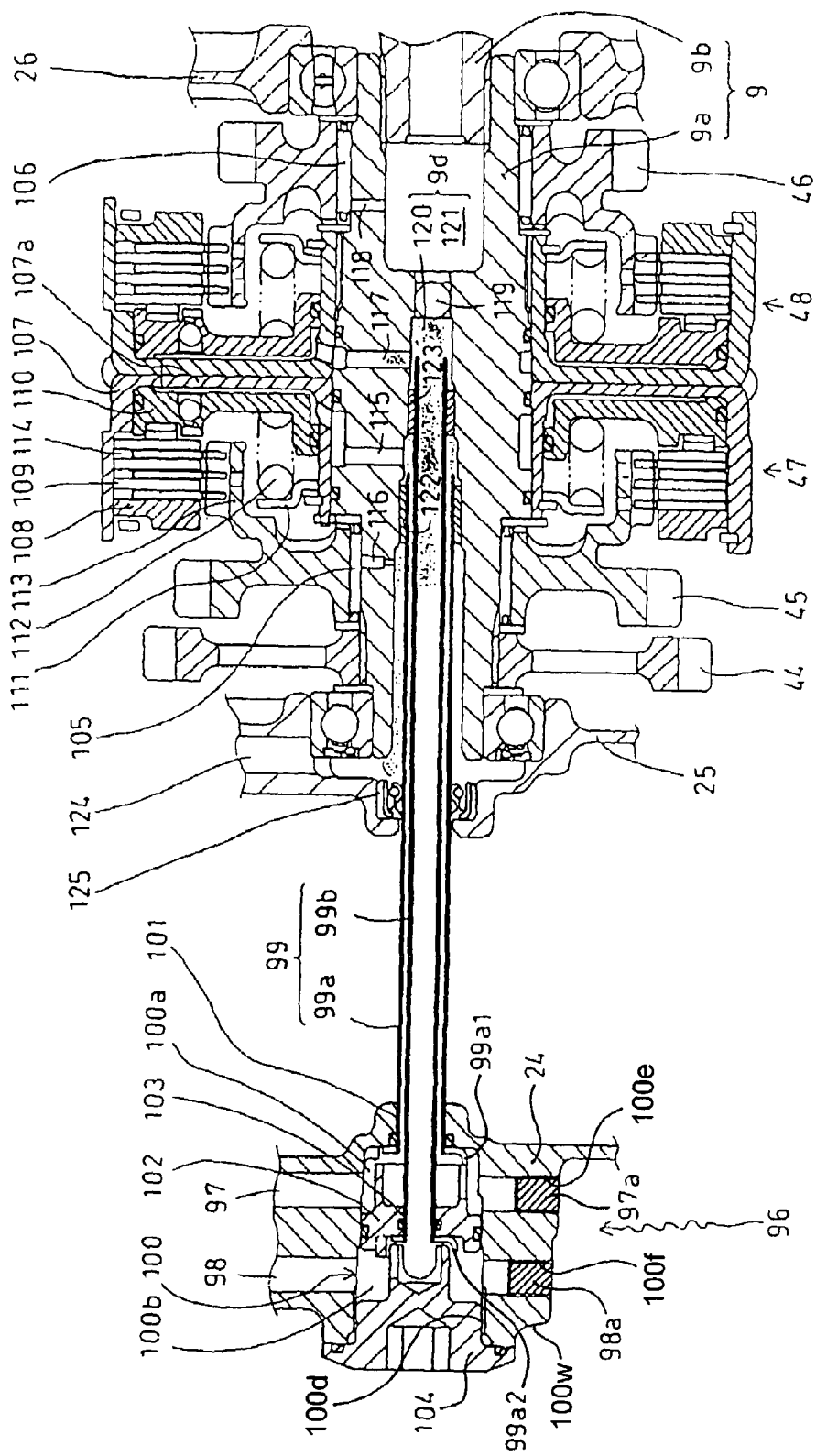
FIG. 14 is an enlarged sectional view showing the vicinity of a fluid passage connecting part, a double tube for supplying hydraulic fluid and the counter shaft.

FIG. 14 is an enlarged sectional view showing the vicinity of the fluid passage connecting part 96, the double tube for supplying hydraulic fluid 99 and the counter shaft 9. The fluid passage connecting part 96 with a front opening 100d is provided on the front crankcase cover 24. In the fluid passage connecting part 96, the fluid passages 97 and 98 are bored in a thick part formed in the front crankcase cover 24 downwardly as view in FIG. 14. A fluid reservoir 100, like a container, is bored from the front. A small hole 101 is formed at the bottom of the fluid reservoir 100. An outer tube 99a of the double tube for supplying hydraulic fluid 99 is inserted into the small hole 101 via an o-ring. Further, a partitioning member 102 is installed in each intermediate part of the openings of the fluid passages 97 and 98 in the fluid reservoir 100 like a container via an o-ring. An inner tube 99b of the double tube for supplying hydraulic fluid 99 is inserted into a small hole 103 made in the center of the partitioning member 102 via an o-ring. A lid 104, for preventing fluid from leaking, is fixed to a front the front opening 100d and front wall 100w of the fluid passage conneting part 96 via an o-ring by a screw. In addition, openings 100e, 100f at the lower ends of the fluid passages 97 and 98 of the fluid passage connecting part 96 are blocked by blocking bolts 97a and 98a. A first fitting part 99a1 is provided between the front crankcase cover 24 and the outer tube 99a and a second fitting part 99a2 is provided between the partitioning member 102 and the inner tube 99b. The fitting parts prevent the outer tube 99a and the inner tube 99b from rotating. The revolution of the partitioning member 102 itself is prevented by the friction of the o-ring.

The fluid reservoir 100 is partitioned into a first small fluid reservoir 100a on the side of the bottom and a second small fluid reservoir 100b on the side of the lid 104 by the partitioning member 102. The first small fluid reservoir 100a is connected to a fluid passage between the outer tube 99a and the inner tube 99b. The second small fluid reservoir 100b is connected to a fluid passage in the inner tube 99b.

The first-speed driven gear 44, the second-speed driven gear 45 and the third-speed driven gear 46 are provided on the front counter shaft 9a as described above. The second-speed driven gear 45 and the third-speed driven gear 46 are idle gears supported by the front counter shaft 9a via needle bearings 105 and 106. The hydraulic multiple disc clutch for the second speed 47 and the hydraulic multiple disc clutch for the third speed 48 are inserted between the driven gears 45 and 46 and the counter shaft 9.

The hydraulic multiple disc clutch for the second speed 47 is composed of a clutch outer 107 like a container fixed to the counter shaft 9, a circular stopper 108 fixed to an open end of the clutch outer 107, an outer clutch plate 109 held by the inside face of the clutch outer via a spline so that the outside clutch plate can be axially displaced A pressure plate 110 is provided adjacent to the bottom wall 107a of the clutch outer 107 and is fitted like a piston. A coil spring 112 is provided between a fitting part 111 provided on the clutch outer 107 and the pressure plate 110 for pressing the pressure plate I 10 towards the bottom wall 107a of the clutch outer 107. A clutch inner 113 is integrated with the second-speed driven gear 45. An inner clutch plate 114 is held by the outside face of the clutch inner 113 via a spline so that the inner clutch plate can be axially displaced and alternated with the outer clutch plate 109. A hydraulic fluid supply hole 115 IS provided for connecting the counter shaft 9 and the clutch outer 107 of the hydraulic multiple disc clutch for the second speed 47. A lubricating oil supply hole 116 is provided for the needle bearing 105 of the second-speed driven gear 45.

When hydraulic fluid is supplied from the hydraulic fluid supply hole 115, it enters between the bottom wall 107a of the clutch outer 107 and the pressure plate 110. The pressure plate 110 is moved against the pressure of the coil spring 112 by oil pressure. The inner and outer clutch plates are axially pressed and the outer clutch plate 109 restrains the movement of the inner clutch plate 114. Thus, the clutch inner 113 is integrated with the clutch outer 107 and the second-speed driven gear 45 is fixed to the counter shaft 9.

The third-speed driven gear 46 and the hydraulic multiple disc clutch for the third speed 48 are also similarly configured. When hydraulic fluid is supplied to a hydraulic fluid supply hole 117 provided in the counter shaft 9, the third-speed driven gear 46 is fixed to the counter shaft 9. A lubricating oil supply hole 118 is provided towards the needle bearing 106 of the third-speed driven gear 46 and is also bored in the counter shaft 9.

The hydraulic fluid supply holes 115 and 117 and the lubricating oil supply holes 116 and 118 are all bored in the front counter shaft 9a and are in communication with the central hole 9d provided on the centerline of the front counter shaft 9a. The central hole 9d includes inside diameters that become smaller by degrees and is partitioned into a front central hole 120 and a rear central hole 121 by a steel ball 119 press-fitted into the narrowest part. The rear central hole 121 communicates with a central hole of a rear counter shaft 9b. The hydraulic fluid supply holes 115 and 117 and the lubricating oil supply hole 116 are in communication with the front central hole 120. The lubricating oil supply hole 118 are in communication with the rear central hole 121.

The rear end of the double tube 99 for supplying hydraulic fluid the front end of which is connected to the fluid passage connecting part 96 of the front crankcase cover 24 is inserted into the front central hole 120 of the front counter shaft 9a. The rear end of the outer tube 99a is supported via a bushing 122 provided between the lubricating oil supply hole 116, the hydraulic fluid supply hole 115 and an opening in the central hole. An oil seal 125 is inserted between the front crankcase 25 and the outer tube 99a. The rear end of the inner tube 99b is supported via a bushing 123 provided between the hydraulic fluid supply hole 115, the hydraulic fluid supply hole 117 and an opening in the central hole. As the outer tube 99a and the inner tube 99b are not rotated though the counter shaft 9 is rotated, each outside face of the tubes is slid on each inside face of the bushings 122 and 123 supported by the inside face of the counter shaft 9.

The outer tube 99a and the inner tube 99b are installed from the front of the front crankcase cover 24 after the front crankcase cover 24 is attached to the transmission. The revolution of the outer tube 99a and the inner tube 99b is prevented by a fitting part, however, work for attaching/detaching by axial movement can be executed in a state in which the lid 104 of the fluid passage connecting part 96 is detached.

Hydraulic fluid supplied to the hydraulic multiple disc clutch for the second speed 47 is fed from the outlet 82 of hydraulic fluid of the valve body 60 shown in FIG. 9 towards the hydraulic multiple disc clutch for the second speed and is injected from the hydraulic fluid supply hole 115 via the fluid passage 97 shown in FIG. 3, the first small fluid reservoir 100a of the fluid passage connecting part 96 shown in FIG. 14 and a fluid passage between the outer tube 99a and the inner tube 99b. Hydraulic fluid supplied to the hydraulic multiple disc clutch for the third speed 48 is fed from the outlet 83 of the hydraulic fluid of the valve body 60 shown in FIG. 9 towards the hydraulic multiple disc clutch for the third speed and is injected from the hydraulic fluid supply hole 117 via the fluid passage 98 shown in FIG. 3, the second small fluid reservoir 100b of the fluid passage connecting part 96 shown in FIG. 14 and a fluid passage in the inner tube 99b. Fluid is discharged via a path reverse to the parts.

Lubricating oil supplied to the needle bearing 105 of the second-speed driven gear 45 enters the front central hole 120 of the counter shaft 9 via the oil passages 93 and 94 shown in FIG. 3 and an oil passage 124 bored in the front crankcase 25, shown in FIG. 14, and is injected from the lubricating oil supply hole 116. Lubricating oil supplied to the needle bearing 106 of the third-speed driven gear 46 is injected from the lubricating oil supply hole 118 via an oil passage not shown connected to the oil passages 93 and 94 shown in FIG. 3 of the rear crankcase cover 27 and the rear counter shaft 9b.

As described in detail above, in this embodiment, even if a plurality of pieces of hydraulic equipment are provided on the revolving shaft, fluid that is different in pressure can be supplied from one end of the revolving shaft. Therefore, as the hydraulic fluid supply hole and the lubricating oil supply hole are respectively provided on the revolving shaft both have only to be bored so that they are perpendicular to the centerline of the revolving shaft. The conventional type working of a diagonal hole is not required to be applied to the revolving shaft. Thus, working time and the cost can be reduced. Even if the hydraulic fluid supply passage on the side of the front crankcase cover and the revolving shaft are spaced apart, hydraulic fluid or other fluids can be supplied from the side of the front crankcase cover towards the plurality of pieces of hydraulic equipment via the double tube for supplying hydraulic fluid.

Also, as the double tube for supplying hydraulic fluid can be attached after the front crankcase cover is attached or the front crankcase cover can be detached after the double tube for supplying hydraulic fluid is detached, the attachment/detachment of the front crankcase cover is facilitated and serviceability can be enhanced. As the double tube for supplying hydraulic fluid can be detached, a large location for storing the front crankcase cover is not required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic fluid feeder, comprising:
a revolving shaft provided with at least one piece of hydraulic equipment operated by switching oil pressure on the revolving shaft;
a central hole provided within the revolving shaft and along a centerline of the revolving shaft;
a first hollow tube having a smaller outside diameter than an inside diameter of the central hole is concentrically inserted into the central hole;
a second hollow tube having a smaller outside diameter than an inside diameter of the first shaft is concentrically inserted into the central hole, the first and the second hollow tubes forming a double tube partitioning the central hole into three passages, and at least a first one of the passages being a hydraulic fluid supply passage for the at least one piece of hydraulic equipment and at least a second one of the passages being a lubricating oil supply passage for a bearing supporting the revolving shaft;
a casing having a fluid passage connecting part, the casing covering said revolving shaft and the first and second hollow tubes, the fluid passage connecting part providing a fluid reservoir with a front opening which is exposed to an outside wall of the casing, the casing also having a first hole arranged at an inside of the fluid reservoir;
a hydraulic passage;
a partitioning member within the casing for partitioning the fluid reservoir into a first fluid reservoir and a second fluid reservoir, said partitioning member further including an insertion hole in a center of said partitioning member;
a lid fixed to the front opening of the fluid passage connecting part of the casing, thereby being operatively connected to the casing by a screw;
a first fitting part provided between the fluid passage connecting part and the first hollow tube; and
a second fitting part provided between the partitioning member and the second hollow tube,
wherein the first hydraulic fluid supply passage is formed in the fluid passage connecting part and is connected to the first fluid reservoir, and the second hydraulic fluid supply passage is formed in the fluid passage connecting part and is connected to the second fluid reservoir,
wherein the first hollow tube is operatively connected to the first fluid reservoir via the first hole, thereby opening the first hollow tube to the first fluid reservoir, and the second hollow tube is operatively connected to the second fluid reservoir via the insertion hole of the partitioning member, thereby opening the second hollow tube to the second fluid reservoir,
wherein the lid does not make contact with any of the first hollow tube, the second hollow tube, or the partitioning member, and
wherein the first and second fitting parts prevent revolution of the first and second hollow tubes.

2. The hydraulic fluid feeder according to claim 1, wherein the first hollow tube operatively connected to the first fluid reservoir of the casing is attachable or detachable from the outside of the casing through the front opening of the fluid reservoir.

3. The hydraulic fluid feeder according to claim 1, wherein the second hollow tube operatively connected to the second fluid reservoir of the casing is attachable or detachable from the outside of the casing through the front opening of the fluid reservoir.

4. A vehicle power unit comprising:
an engine having a crankshaft, a crankcase, and a crankcase cover;
a transmission having an main shaft, a counter shaft, an intermediate shaft, and an output shaft; and
a hydraulic fluid feeder for the counter shaft provided with at least one piece of hydraulic equipment operated by switching oil pressure on the counter shaft, said hydraulic feeder further including
two hydraulic fluid supply passages formed in a fluid passage connecting part of the crankcase cover, the fluid passage connecting part having a front opening;
a reservoir partitioned into a first fluid reservoir and a second fluid reservoir by a partitioning member within the crankcase cover, said partitioning member further including an insertion hole in a center of said partitioning member, the two hydraulic fluid supply passages connected respectively to the first and second fluid reservoirs;
a central hole provided along a centerline of the counter shaft;
a first hollow tube having a smaller outside diameter than an inside diameter of the central hole is concentrically inserted into the central hole;
a second hollow tube concentrically inserted into the central hole, wherein the first and the second hollow tubes form a double tube partitioning the central hole into two passages, a first of the two passages supplying a hydraulic fluid to the at least one piece of the hydraulic equipment, and a second of the two passages for supplying the hydraulic fluid to another piece of the hydraulic equipment or supplying a lubricating oil supply passage to a bearing supporting the countershaft;
the first of the two passages in the central hole including an upstream end operatively connected to the first fluid reservoir; and
the second of the two passages in the central hole including an upstream end operatively connected to the second fluid reservoir via the center hole in the partitioning member, an opening at a lower end of the second of the two passages being blocked by a second blocking bolt;
a first fitting part provided between the fluid passage connecting part and the first hollow tube; and
a second fitting part provided between the partitioning member and the second hollow tube,
wherein the first and second hollow tubes extend rearwardly and bridge across a space separating the crankcase cover and a front crankcase and then penetrate into the forward-most point of the central bore of the counter shaft,
wherein the first and second hollow tubes penetrate respectively into openings of the first and second fluid reservoirs,
the vehicle power unit further comprising:
a removable lid fitted within a front opening in the fluid passage connecting part of said crankcase cover by a screw and partially closing said second fluid reservoir to permit access to said partitioning member,
wherein the removable lid does not connect with any of the first hollow tube, the second hollow tube, or the partitioning member.

5. The vehicle power unit according to claim 4, wherein the first and second hollow tubes extend between the crankcase cover of the engine and the counter shaft of the transmission.

6. The vehicle power unit according to claim 4, further comprising a removable lid fitted within front opening in the fluid passage connecting part of said crankcase cover and partially enclosing said second fluid reservoir to permit access to said partitioning member.

7. The hydraulic fluid feeder according to claim 4, further comprising a third passage disposed between the first hollow tube and a forward part of the central hole of the counter shaft.

8. The hydraulic fluid feeder according to claim 1, wherein the first hollow tube is inserted through the front opening of the fluid passage connecting part of the casing, and then is fitted into the hole in the casing in order to extend rearwardly from the casing, the hole in the casing being separate from the front opening in the casing.

9. The hydraulic fluid feeder according to claim 4, wherein the first hollow tube is inserted through the front opening in the fluid passage connecting part of the crankcase cover, and then is fitted into a hole on an inward facing side of the crankcase cover, the hole being separate from the front opening in the crankcase cover.

10. The hydraulic fluid feeder according to claim 1, wherein the hydraulic fluid supply passage includes:

two hydraulic fluid supply passages formed by downward bores in the fluid passage connecting part of the casing, the two hydraulic fluid supply passages connected respectively to the first and second fluid reservoirs.

* * * * *